US010412681B2

(12) United States Patent
Hodges et al.

(10) Patent No.: US 10,412,681 B2
(45) Date of Patent: Sep. 10, 2019

(54) SYSTEM AND METHOD FOR CONTROLLING COMMUNICATION DEVICE USE

(71) Applicant: Location Labs, Inc., Emeryville, CA (US)

(72) Inventors: Daniel Hodges, San Francisco, CA (US); Tasos Roumeliotis, Orinda, CA (US); Scott Hotes, Berkeley, CA (US)

(73) Assignee: Location Labs, Inc., Emeryville, CA (US)

( * ) Notice: Subject to any disclaimer, the term of this patent is extended or adjusted under 35 U.S.C. 154(b) by 203 days.

(21) Appl. No.: 15/412,439

(22) Filed: Jan. 23, 2017

(65) Prior Publication Data
US 2017/0135045 A1    May 11, 2017

Related U.S. Application Data

(62) Division of application No. 13/723,119, filed on Dec. 20, 2012, now Pat. No. 9,554,190.

(51) Int. Cl.
*H04W 52/02* (2009.01)
*H04M 1/67* (2006.01)
(Continued)

(52) U.S. Cl.
CPC ........ *H04W 52/0264* (2013.01); *G06F 21/62* (2013.01); *H04M 1/67* (2013.01);
(Continued)

(58) Field of Classification Search
CPC .......... H04N 21/4751; H04N 21/44222; G06F 21/62; H04W 52/0277
See application file for complete search history.

(56) References Cited

U.S. PATENT DOCUMENTS 3,778,809 A * 12/1973 Hawes .................. G08B 21/18
                                                              340/309.16
4,956,825 A    9/1990 Wilts et al.
(Continued)

FOREIGN PATENT DOCUMENTS

| EP | 1770969 | 9/2009 |
| FR | 2863439 | 6/2005 |
| WO | WO2011137279 | 11/2011 |

OTHER PUBLICATIONS

Loss leader, from Wikipedia, downloaded from https://en.wikipedia.org/wiki/Loss_leader on Aug. 25, 2015.
(Continued)

*Primary Examiner* — Christopher E. Everett
(74) *Attorney, Agent, or Firm* — Dovas Law, P.C.

(57) ABSTRACT

A computer implemented method is provided including establishing a value corresponding to a particular user of a device, receiving an indication of a triggering condition of the particular user of the device, the triggering condition being enabled by the device or measurable by the device, and determining the triggering condition has been met by the user via the device. The method further includes modifying the value responsive to determining the triggering condition has been met, determining when the value crosses a particular threshold, and disabling an application or a functional component of the device responsive to the value crossing the particular threshold. A system for implementing the method is also provided.

13 Claims, 7 Drawing Sheets

(51) Int. Cl.
*H04N 21/442* (2011.01)
*H04N 21/475* (2011.01)
*G06F 21/62* (2013.01)
*H04M 1/725* (2006.01)
*H04W 84/12* (2009.01)

(52) U.S. Cl.
CPC ... *H04M 1/72572* (2013.01); *H04M 1/72577* (2013.01); *H04N 21/44222* (2013.01); *H04N 21/4751* (2013.01); *H04W 52/0277* (2013.01); *H04W 84/12* (2013.01); *Y02D 70/142* (2018.01); *Y02D 70/164* (2018.01)

(56) References Cited

U.S. PATENT DOCUMENTS

| | | | |
|---|---|---|---|
| 5,434,562 A | 7/1995 | Reardon | |
| 5,559,862 A | 9/1996 | Bhagat et al. | |
| 5,673,691 A | 10/1997 | Abrams | |
| 5,833,479 A | 10/1998 | Talbot | |
| 5,882,258 A | 3/1999 | Kelly et al. | |
| 5,907,831 A | 5/1999 | Lotvin | |
| 5,973,683 A | 10/1999 | Cragun et al. | |
| 6,011,973 A | 1/2000 | Valentine et al. | |
| 6,023,692 A | 2/2000 | Nichols | |
| 6,151,507 A | 11/2000 | Laiho et al. | |
| 6,161,008 A | 12/2000 | Lee et al. | |
| 6,587,835 B1 | 7/2003 | Treyz et al. | |
| 6,690,940 B1 | 2/2004 | Brown et al. | |
| 6,782,266 B2 | 8/2004 | Baer et al. | |
| 7,178,720 B1 | 2/2007 | Strubbe | |
| 7,181,229 B2 | 2/2007 | Singh et al. | |
| 7,257,367 B2 | 8/2007 | Etuk et al. | |
| 7,606,772 B2 | 10/2009 | Flinn et al. | |
| 7,729,945 B1 | 6/2010 | Katz et al. | |
| 7,849,502 B1 | 12/2010 | Bloch et al. | |
| 7,869,792 B1 | 1/2011 | Zhou et al. | |
| 7,899,438 B2 | 3/2011 | Baker et al. | |
| 8,010,037 B2 | 8/2011 | Bannwolf | |
| 8,073,907 B2 | 12/2011 | Roumeliotis et al. | |
| 8,095,413 B1 | 1/2012 | Beaven | |
| 8,121,879 B1 | 2/2012 | Cohen | |
| 8,135,392 B2 | 3/2012 | Marcellino | |
| 8,145,240 B2 | 3/2012 | Roumeliotis et al. | |
| 8,175,642 B2 | 5/2012 | Shah | |
| 8,193,982 B2 | 6/2012 | Kupfer | |
| 8,229,421 B2 | 7/2012 | Hotes et al. | |
| 8,244,236 B2 | 8/2012 | Roumeliotis et al. | |
| 8,270,933 B2 | 10/2012 | Riemer et al. | |
| 8,280,438 B2 | 10/2012 | Barbara | |
| 8,315,905 B1 | 11/2012 | Adair | |
| 8,348,555 B2 | 2/2013 | Rosen | |
| 8,384,555 B2 | 2/2013 | Rosen | |
| 8,401,521 B2 | 3/2013 | Bennett | |
| 8,412,154 B1* | 4/2013 | Leemet | H04M 15/58 455/406 |
| 8,447,279 B1 | 5/2013 | Peng et al. | |
| 8,417,268 B1 | 9/2013 | Halferty et al. | |
| 8,527,013 B2 | 9/2013 | Guba et al. | |
| 8,620,354 B2 | 12/2013 | Beasley | |
| 8,621,075 B2 | 12/2013 | Luna | |
| 8,635,708 B2 | 1/2014 | Mahan | |
| 8,731,530 B1 | 5/2014 | Breed et al. | |
| 8,738,688 B2 | 5/2014 | Myers | |
| 8,761,821 B2 | 6/2014 | Tibbitts et al. | |
| 8,825,035 B2 | 9/2014 | Moton | |
| 8,849,095 B2 | 9/2014 | Hoofien | |
| 8,971,927 B2 | 3/2015 | Zhou et al. | |
| 9,019,068 B2 | 4/2015 | Varoglu | |
| 9,042,872 B1 | 5/2015 | Breed et al. | |
| 9,124,703 B2 | 9/2015 | Tadayon | |
| 2001/0023198 A1* | 9/2001 | Muto | H04W 52/0261 455/573 |
| 2001/0029196 A1* | 10/2001 | Wakamatsu | H04W 52/0264 455/574 |
| 2002/0012894 A1 | 1/2002 | Becker | |
| 2002/0016189 A1* | 2/2002 | Sheynblat | G01S 5/145 455/574 |
| 2002/0049806 A1 | 4/2002 | Gatz et al. | |
| 2002/0116266 A1 | 8/2002 | Marshall | |
| 2002/0147037 A1* | 10/2002 | Kwon | G06F 1/263 455/574 |
| 2002/0169539 A1 | 11/2002 | Menard et al. | |
| 2002/0177475 A1* | 11/2002 | Park | H04W 52/027 455/574 |
| 2002/0178046 A1 | 11/2002 | Lawrence | |
| 2003/0005306 A1 | 1/2003 | Hunt et al. | |
| 2003/0064788 A1 | 4/2003 | Walker et al. | |
| 2003/0082508 A1 | 5/2003 | Barney | |
| 2003/0126267 A1 | 7/2003 | Gutta et al. | |
| 2003/0139175 A1 | 7/2003 | Kim | |
| 2003/0158609 A1* | 8/2003 | Chiu | G06F 1/3203 700/22 |
| 2003/0211889 A1 | 11/2003 | Walker et al. | |
| 2003/0216960 A1 | 11/2003 | Porstrel | |
| 2004/0024569 A1 | 2/2004 | Camillo | |
| 2004/0030599 A1 | 2/2004 | Sie et al. | |
| 2004/0039624 A1 | 2/2004 | Ikezawa et al. | |
| 2004/0111479 A1 | 6/2004 | Borden et al. | |
| 2004/0161085 A1 | 8/2004 | Horne | |
| 2004/0166878 A1 | 8/2004 | Erskine et al. | |
| 2004/0186776 A1 | 9/2004 | Llach | |
| 2004/0219493 A1 | 11/2004 | Phillips | |
| 2004/0267607 A1 | 12/2004 | Maddux | |
| 2005/0003895 A1 | 1/2005 | Nara | |
| 2005/0039206 A1 | 2/2005 | Opdyche | |
| 2005/0096009 A1* | 5/2005 | Ackley | H04M 1/663 455/405 |
| 2005/0096030 A1 | 5/2005 | Boyd | |
| 2005/0195193 A1 | 9/2005 | Lehman | |
| 2005/0243771 A1 | 11/2005 | Hardy et al. | |
| 2005/0282559 A1 | 12/2005 | Erskine et al. | |
| 2005/0287502 A1 | 12/2005 | Southard et al. | |
| 2006/0009234 A1 | 1/2006 | Freer | |
| 2006/0085547 A1 | 4/2006 | Cormier | |
| 2006/0089878 A1 | 4/2006 | Roberts et al. | |
| 2006/0117263 A1 | 6/2006 | Locke | |
| 2006/0135120 A1 | 6/2006 | Likourezos | |
| 2006/0184792 A1 | 8/2006 | Berlin | |
| 2006/0200435 A1 | 9/2006 | Flinn et al. | |
| 2006/0270476 A1 | 11/2006 | Denkewicz | |
| 2006/0276180 A1 | 12/2006 | Henry | |
| 2007/0039624 A1 | 2/2007 | Roberts et al. | |
| 2007/0088610 A1 | 4/2007 | Chen | |
| 2007/0100595 A1 | 5/2007 | Earles et al. | |
| 2007/0142068 A1 | 6/2007 | Matsuo | |
| 2007/0150567 A1 | 6/2007 | Lamparello et al. | |
| 2007/0203872 A1 | 8/2007 | Flinn et al. | |
| 2007/0208802 A1 | 9/2007 | Barman | |
| 2007/0232340 A1 | 10/2007 | Yamauchi et al. | |
| 2007/0243852 A1* | 10/2007 | Gibbs | H04W 52/0264 455/343.5 |
| 2007/0282678 A1 | 12/2007 | Dendi et al. | |
| 2008/0005325 A1 | 1/2008 | Wynn et al. | |
| 2008/0066020 A1 | 3/2008 | Boss et al. | |
| 2008/0070588 A1 | 3/2008 | Morin et al. | |
| 2008/0077489 A1 | 3/2008 | Gilley et al. | |
| 2008/0146211 A1 | 6/2008 | Mikan et al. | |
| 2008/0146250 A1 | 6/2008 | Aaron | |
| 2008/0172317 A1 | 7/2008 | Deibert et al. | |
| 2008/0177834 A1 | 7/2008 | Gruhl et al. | |
| 2008/0183560 A1 | 7/2008 | Kaplan et al. | |
| 2008/0199199 A1 | 8/2008 | Kato et al. | |
| 2008/0201469 A1 | 8/2008 | Reasor | |
| 2008/0242311 A1 | 10/2008 | Craine et al. | |
| 2008/0246605 A1 | 10/2008 | Pfeffer et al. | |
| 2008/0270038 A1 | 10/2008 | Partovi | |
| 2008/0307243 A1* | 12/2008 | Lee | G06F 1/3203 713/320 |
| 2009/0017750 A1 | 1/2009 | Marcinkiewicz | |
| 2009/0038005 A1 | 2/2009 | Howarth | |
| 2009/0055938 A1 | 2/2009 | Samuel | |
| 2009/0064316 A1 | 3/2009 | Liao et al. | |
| 2009/0089876 A1 | 4/2009 | Finamore et al. | |

(56) References Cited

U.S. PATENT DOCUMENTS

| | | | |
|---|---|---|---|
| 2009/0098914 A1* | 4/2009 | Martin-Cocher | H04W 52/0261 455/572 |
| 2009/0125499 A1 | 5/2009 | Cross et al. | |
| 2009/0149203 A1 | 6/2009 | Backholm et al. | |
| 2009/0181356 A1 | 7/2009 | Dasgupta | |
| 2009/0203352 A1 | 8/2009 | Fordon et al. | |
| 2009/0204471 A1 | 8/2009 | Elenbaas et al. | |
| 2009/0251282 A1 | 10/2009 | Fitzgerald et al. | |
| 2009/0275367 A1 | 11/2009 | Reinisch et al. | |
| 2009/0286218 A1 | 11/2009 | Johnson et al. | |
| 2009/0295562 A1 | 12/2009 | Shuster | |
| 2009/0296904 A1 | 12/2009 | Brewer et al. | |
| 2009/0298019 A1 | 12/2009 | Rogan et al. | |
| 2010/0028844 A1 | 2/2010 | Wiseman | |
| 2010/0042493 A1 | 2/2010 | Nino et al. | |
| 2010/0058446 A1 | 3/2010 | Thwaites | |
| 2010/0077444 A1 | 3/2010 | Forristal | |
| 2010/0100618 A1 | 4/2010 | Kuhlke et al. | |
| 2010/0116884 A1 | 5/2010 | Alderucci et al. | |
| 2010/0125028 A1 | 5/2010 | Heppert | |
| 2010/0145976 A1 | 6/2010 | Higgins et al. | |
| 2010/0161369 A1 | 6/2010 | Farrell et al. | |
| 2010/0211694 A1 | 8/2010 | Razmov et al. | |
| 2010/0211887 A1 | 8/2010 | Woolcombe | |
| 2010/0216509 A1 | 8/2010 | Riemer et al. | |
| 2010/0235223 A1 | 9/2010 | Lyman | |
| 2010/0240399 A1 | 9/2010 | Roumeliotis et al. | |
| 2010/0241496 A1 | 9/2010 | Gupta et al. | |
| 2010/0246797 A1 | 9/2010 | Chavez et al. | |
| 2010/0250352 A1 | 9/2010 | Moore | |
| 2010/0268768 A1 | 10/2010 | Kurtenbach et al. | |
| 2010/0285871 A1 | 11/2010 | Shah et al. | |
| 2010/0306138 A1 | 12/2010 | Hotes et al. | |
| 2010/0317420 A1 | 12/2010 | Hoffberg | |
| 2010/0332233 A1* | 12/2010 | Chen | H02J 1/14 704/270 |
| 2011/0029598 A1 | 2/2011 | Arnold et al. | |
| 2011/0047078 A1 | 2/2011 | Ginter et al. | |
| 2011/0070567 A1 | 3/2011 | Linton | |
| 2011/0092159 A1 | 4/2011 | Park et al. | |
| 2011/0124399 A1 | 5/2011 | Dutilly et al. | |
| 2011/0125844 A1 | 5/2011 | Collier et al. | |
| 2011/0145927 A1 | 6/2011 | Hubner et al. | |
| 2011/0218884 A1 | 9/2011 | Kothari et al. | |
| 2011/0228753 A1 | 9/2011 | Polito et al. | |
| 2011/0236872 A1 | 9/2011 | Taylor | |
| 2011/0244825 A1 | 10/2011 | Ewell | |
| 2011/0244837 A1 | 10/2011 | Murata et al. | |
| 2011/0250904 A1 | 10/2011 | Valleta et al. | |
| 2011/0252375 A1 | 10/2011 | Chaudri | |
| 2011/0302003 A1 | 12/2011 | Shirish et al. | |
| 2011/0302024 A1 | 12/2011 | Gunawardana et al. | |
| 2011/0320259 A1 | 12/2011 | Roumeliotis et al. | |
| 2012/0036220 A1 | 2/2012 | Dare et al. | |
| 2012/0040761 A1 | 2/2012 | Auterlo et al. | |
| 2012/0047560 A1 | 2/2012 | Underwood et al. | |
| 2012/0058744 A1 | 3/2012 | Felt et al. | |
| 2012/0066088 A1 | 3/2012 | Murset | |
| 2012/0069131 A1 | 3/2012 | Abelow | |
| 2012/0072340 A1 | 3/2012 | Amron | |
| 2012/0084349 A1 | 4/2012 | Lee et al. | |
| 2012/0100866 A1 | 4/2012 | Grossman et al. | |
| 2012/0131161 A1 | 5/2012 | Ferris et al. | |
| 2012/0143496 A1 | 6/2012 | Chitre et al. | |
| 2012/0151045 A1 | 6/2012 | Anakata | |
| 2012/0151046 A1 | 6/2012 | Weiss | |
| 2012/0151047 A1 | 6/2012 | Hodges et al. | |
| 2012/0151384 A1 | 6/2012 | Stass | |
| 2012/0157076 A1 | 6/2012 | Choi | |
| 2012/0166285 A1 | 6/2012 | Shapiro et al. | |
| 2012/0172100 A1 | 7/2012 | Colar et al. | |
| 2012/0179767 A1 | 7/2012 | Clarke et al. | |
| 2012/0180135 A1 | 7/2012 | Hodges | |
| 2012/0202528 A1 | 8/2012 | Roumeliotis et al. | |
| 2012/0214472 A1 | 8/2012 | Tadayon | |
| 2012/0215328 A1 | 8/2012 | Schmeizer | |
| 2012/0215617 A1 | 8/2012 | Shah et al. | |
| 2012/0221877 A1* | 8/2012 | Prabu | H04W 52/0235 713/340 |
| 2012/0233256 A1 | 9/2012 | Shaham et al. | |
| 2012/0237908 A1* | 9/2012 | Fitzgerald | G06F 21/88 434/236 |
| 2012/0253918 A1 | 10/2012 | Marois et al. | |
| 2012/0254949 A1 | 10/2012 | Mikkonen et al. | |
| 2012/0260118 A1 | 10/2012 | Jiang et al. | |
| 2012/0271908 A1 | 10/2012 | Luna | |
| 2012/0280916 A1 | 11/2012 | Xia et al. | |
| 2012/0323990 A1 | 12/2012 | Hayworth | |
| 2012/0330702 A1 | 12/2012 | Kowalski et al. | |
| 2013/0040629 A1 | 2/2013 | Sprigg | |
| 2013/0054674 A1 | 2/2013 | Myers | |
| 2013/0055267 A1* | 2/2013 | Noro | G06F 9/4893 718/100 |
| 2013/0084847 A1 | 4/2013 | Tibbitts | |
| 2013/0091453 A1 | 4/2013 | Kotler et al. | |
| 2013/0102286 A1 | 4/2013 | Toksvig et al. | |
| 2013/0104246 A1 | 4/2013 | Bear et al. | |
| 2013/0111462 A1 | 5/2013 | Umansky et al. | |
| 2013/0111510 A1 | 5/2013 | Baker et al. | |
| 2013/0143512 A1 | 6/2013 | Hernandez et al. | |
| 2013/0143528 A1* | 6/2013 | Randazzo | H04W 48/04 455/411 |
| 2013/0145007 A1 | 6/2013 | Randazzo et al. | |
| 2013/0151628 A1 | 6/2013 | Catalano et al. | |
| 2013/0177006 A1 | 7/2013 | Baek et al. | |
| 2013/0198272 A1 | 8/2013 | Shionoya | |
| 2013/0198296 A1 | 8/2013 | Roy et al. | |
| 2013/0282889 A1 | 10/2013 | Tito | |
| 2013/0303143 A1 | 11/2013 | Schrader | |
| 2013/0305384 A1 | 11/2013 | Weiss | |
| 2013/0316746 A1 | 11/2013 | Miller et al. | |
| 2013/0332886 A1 | 12/2013 | Cranfil et al. | |
| 2013/0339345 A1 | 12/2013 | Soto et al. | |
| 2013/0346333 A1 | 12/2013 | Hassler et al. | |
| 2014/0057610 A1 | 2/2014 | Olincy et al. | |
| 2014/0082065 A1 | 3/2014 | Anakata et al. | |
| 2014/0099921 A1 | 4/2014 | Weiss | |
| 2014/0108649 A1 | 4/2014 | Barton et al. | |
| 2014/0148192 A1 | 5/2014 | Hodges et al. | |
| 2014/0179261 A1 | 6/2014 | Riggs | |
| 2014/0180438 A1 | 6/2014 | Hodges et al. | |
| 2014/0187219 A1 | 7/2014 | Yang | |
| 2014/0194095 A1 | 7/2014 | Wynne et al. | |
| 2014/0258357 A1 | 9/2014 | Singh et al. | |
| 2014/0310327 A1 | 10/2014 | Yip et al. | |
| 2014/0310365 A1 | 10/2014 | Sample et al. | |
| 2014/0310403 A1 | 10/2014 | Weiss et al. | |
| 2014/0338006 A1 | 11/2014 | Grkov et al. | |
| 2014/0364153 A1 | 12/2014 | Ren | |
| 2014/0370857 A1 | 12/2014 | Bovis | |
| 2015/0040246 A1 | 2/2015 | Yuen et al. | |
| 2015/0188777 A1 | 7/2015 | Frost | |
| 2015/0227752 A1 | 8/2015 | Anakata | |
| 2015/0350410 A1 | 12/2015 | Weiss et al. | |
| 2016/0014262 A1 | 1/2016 | Hodges et al. | |

OTHER PUBLICATIONS

Coupon, from Wikipedia, downloaded from https://en.wikipedia.org/wiki/Coupon on Mar. 9, 2015.

Kohavi, "Emerging Trends in Business Analytics", Communications of the ACM, Aug. 2002, vol. 45, No. 8, pp. 45-48.

* cited by examiner

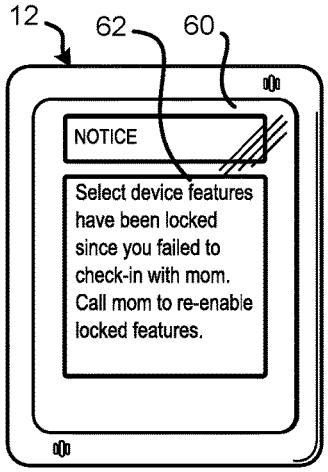
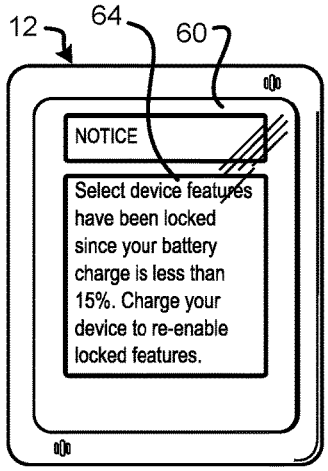
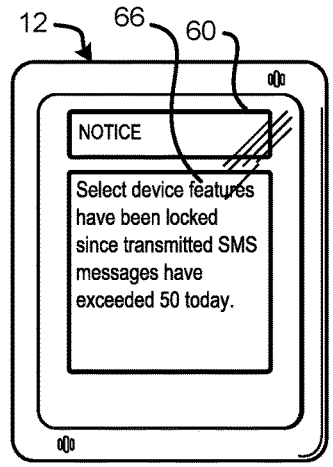
FIG. 7A     FIG. 7B     FIG. 7C
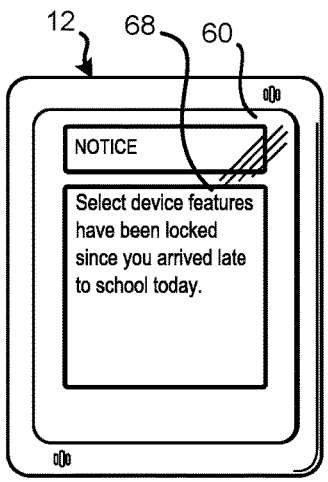
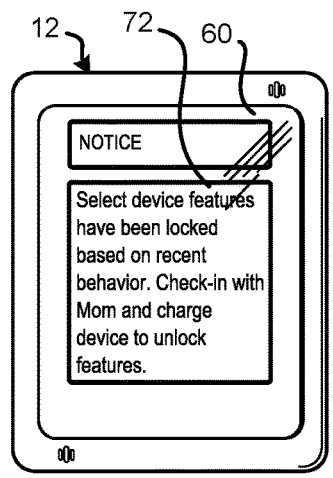
FIG. 7D     FIG. 7E     FIG. 7F
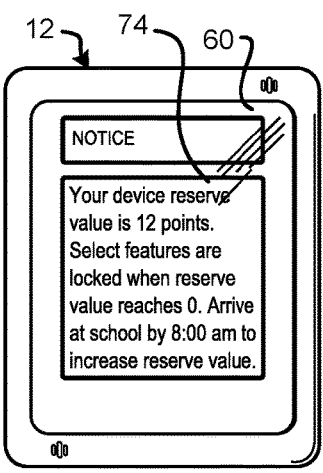
FIG. 7G

SYSTEM AND METHOD FOR CONTROLLING COMMUNICATION DEVICE USE

BACKGROUND

With the advent of smartphones, laptops, tablets and other portable electronic devices, a child may now have un-tethered access to the Internet, various communication protocols (e.g. phone, video phone, email, text chatting, and text messaging) and a wide variety of digital entertainment. However, such devices may serve as a distraction which prevents a child from behaving responsibly. Parents are keen to keep an eye on their children's behavior including communication, travel and what media and information their children are exposed to. Further, parents may want to limit the amount of time their children spend exploring and consuming various electronic media (e.g. television and Internet content).

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A computer implemented method of controlling device use is provided. The method includes receiving from a first user an indication of a schedule of required check-in communications, the schedule corresponding to a second user. The method further includes determining when a check-in communication has been initiated by the second user pursuant to the schedule, and disabling at least one of an application and a functional component of a device corresponding to the second user responsive to determining at least one check-in communication has not been received pursuant to the schedule.

Another computer implemented method of controlling device use is provided. The method includes receiving from a first user an indication of a required state of a device corresponding to a second user. The method further includes determining a current state of the device corresponding to the second user, and disabling at least one of an application and a functional component of the device responsive to the current state being inconsistent with the required state.

Another computer implemented method of controlling device use is provided. The method includes receiving from a first user an indication of a maximum allowed use of at least one device corresponding to a second user. The method further includes determining amount of use of the at least one device corresponding to the second user, and disabling at least one of an application and a functional component of the at least one device responsive to the at least one of the determined amount of use being greater than the indicated maximum allowed use.

Another computer implemented method of controlling device use is provided. The method includes receiving an indication from a first user of a geographic area and receiving an indication from the first user of a schedule corresponding to at least one time at which a second user is required to be present at the geographic area. The method further includes receiving location information of a device corresponding to the second user, determining whether the location information indicates that the second user is present at the geographic area at the at least one time, and disabling at least one of an application and a functional component of the device responsive to determining that the second user is not present at the geographic area at the at least one time.

Another computer implemented method of controlling device use is provided. The method includes establishing a value corresponding to a particular user of a device, receiving an indication of at least one triggering condition of the particular user corresponding to the device, the at least one triggering condition being at least one of enabled by the device and measurable by the device, and determining the at least one triggering condition has been met by the user via the device. The method further includes modifying the value responsive to determining the at least one triggering condition has been met, determining when the value crosses a particular threshold, and disabling at least one of an application and a functional component of the device responsive to the value crossing the particular threshold.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein:

FIGS. 7A-7G show example screen displays enabled by the system of FIG. 1.

DETAILED DESCRIPTION OF ILLUSTRATIVE EMBODIMENT(S)

Figure 1:
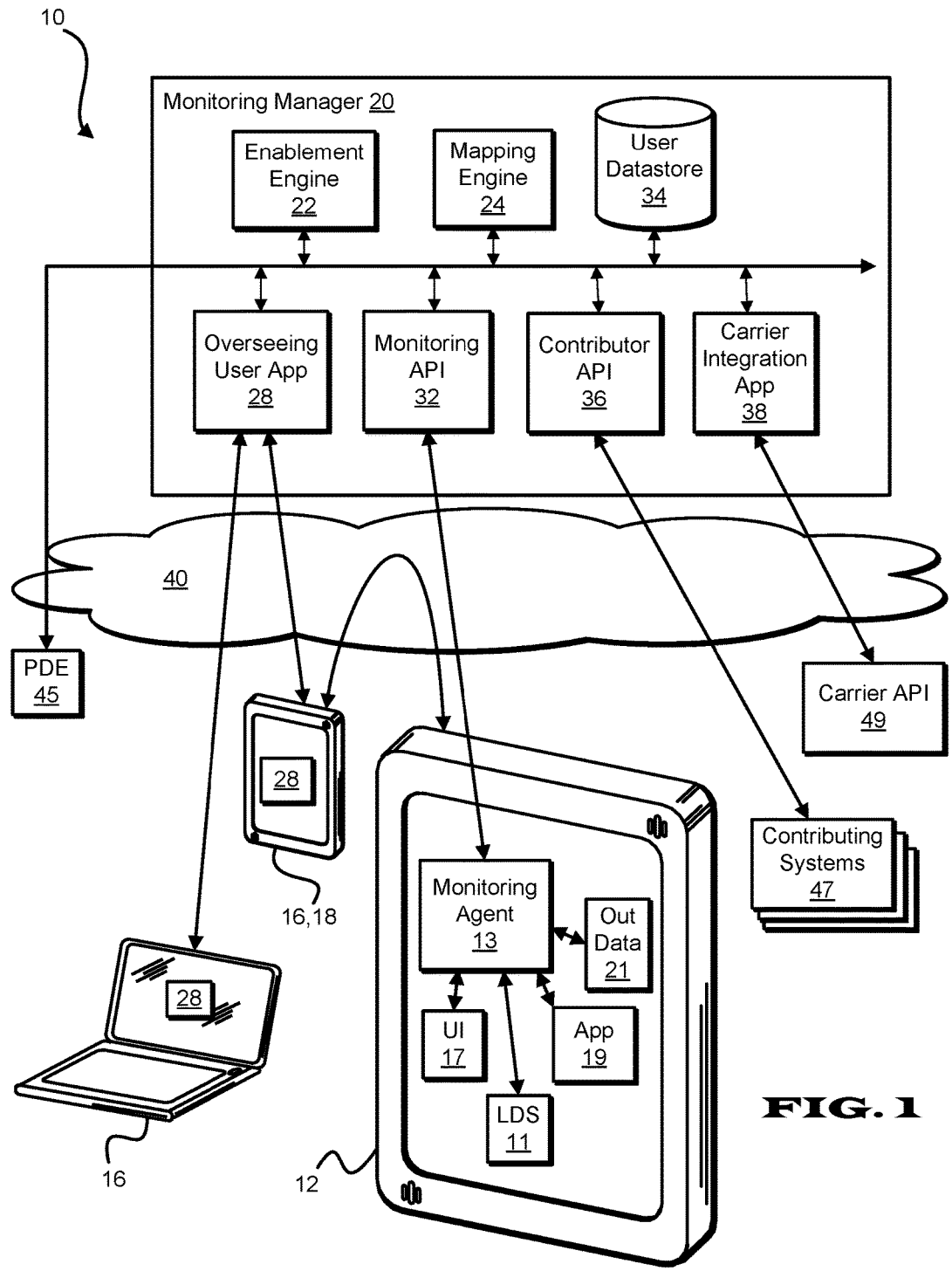
FIG. 1 shows a system for controlling use of a mobile device.

Embodiments are described below with reference to the drawing figures where like numerals represent like elements throughout.

Referring to FIG. 1, a system 10 is provided including a monitoring manager 20 used for controlling use of a monitored device 12. The monitoring manager 20 includes an enablement engine 22, a mapping engine 24, an overseeing user application 28, a monitoring application program interface ("API") 32, a user datastore 34, a contributor application program interface ("API") 36, and a carrier integration application 38. The monitoring manager 20 can be implemented on one or more network-connectable computing systems and need not be implemented on a single system at a single location. The monitoring manager 20 is configured for communication via a network 40 with other network-connectable computing systems including one or more devices 12 ("monitored devices") corresponding to a monitored user and client devices 16 corresponding to a user who configures the monitoring manager 20. Alternatively, the monitoring manager 20 or one or more components thereof can be executed on the monitored device 12 or other system. The overseeing user application 28 includes a web application or other application enabled by the monitoring manager 20 and accessible to a client device 16 via a network and/or installed and executed on a client device 16.

The network 40 can include one or more wired or wireless networks, including for example the internet and wireless carrier systems. The monitored device 12, and the client devices 16 can include for example a smartphone, laptop computer or other wired or wireless terminal preferably configured to operate on a wired or wireless telecommunication network. The operation of the monitoring manager 20 is described herein with respect to the devices 12, 16. One skilled in the art will recognize that the monitoring manager 20 can operate with other suitable wired or wireless network-connectable computing systems.

Software and/or hardware residing on a monitored device 12 enables a monitoring agent 13 in the form of a client application which can provide device location information and device use information to the monitoring manager 20 via the monitoring API 32. In addition to components enabling data processing and wireless communication, the monitored device 12 includes a location determination system ("LDS") 15, such as a global positioning system ("GPS") receiver, from which the monitoring agent 13 gathers data used for determining location of the monitored device 12. A monitored user operates the monitored device 12 with the monitoring agent 13 active.

Figure 2:
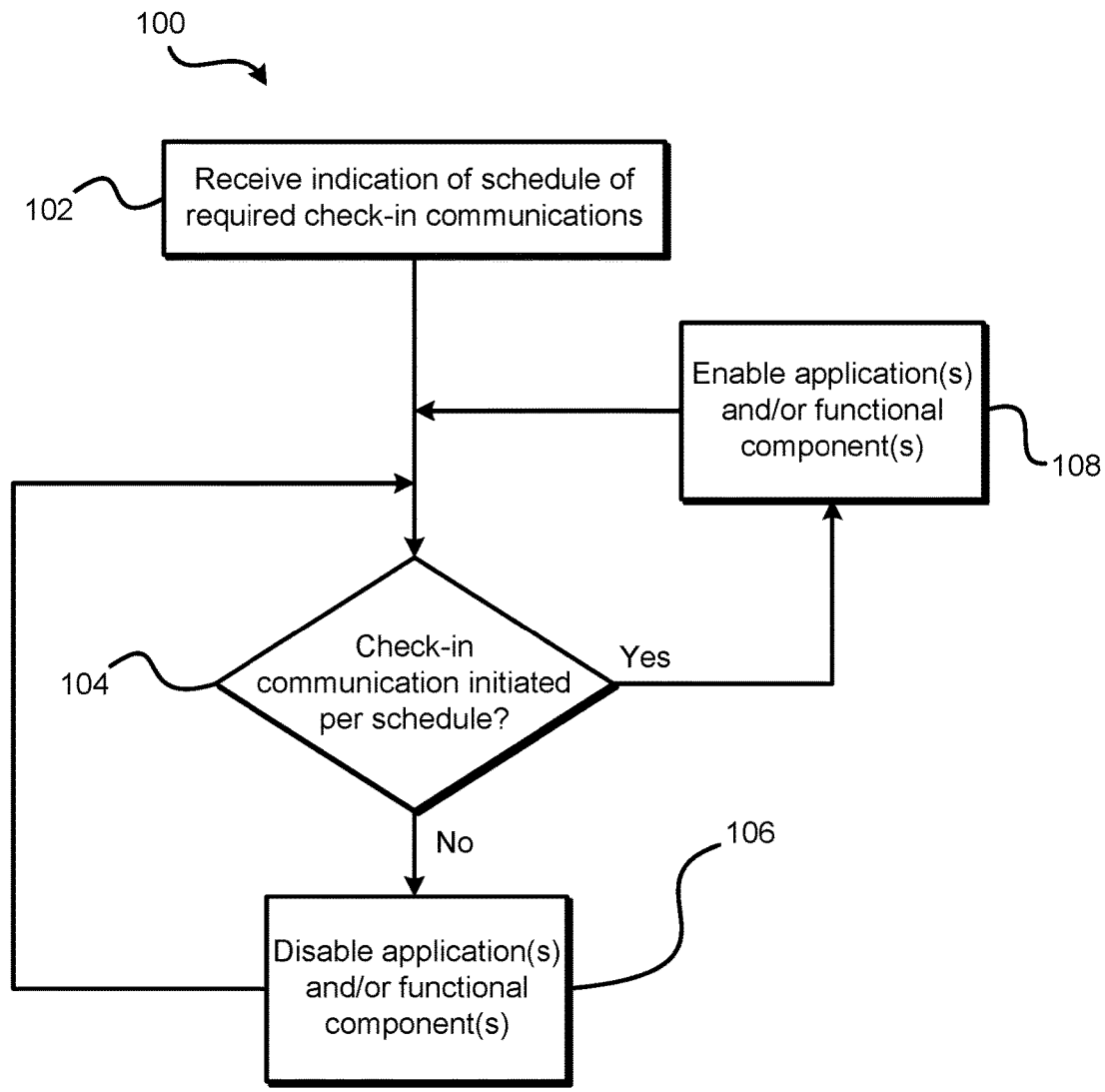
FIGS. 2-6 are diagrams showing methods for controlling use of a mobile device.

Referring to FIG. 2, a method 100 for controlling communication device use is shown. The method 100 is described with reference to the components shown in the system 10 of FIG. 1, including the monitoring manager 20 and monitoring agent 13, which are preferably configured for performing the method 100 and include or have access to suitable non-transitory data storage including instructions for performing the method 100. The method 100 may alternatively be performed by the monitoring agent 13 alone, the monitoring manager 20 alone, or via other suitable systems and devices. The method 100 is not limited to the components shown in FIG. 1 which are merely exemplary.

In a step 102, the monitoring manager 20 receives from a first user (hereinafter "monitoring user") an indication of a schedule of required check-in communications, the schedule corresponding to a second user (hereinafter "monitored user"). The monitoring user can correspond for example to a parent, and the monitored user can correspond to a child of the parent for whom the parent desires to control or limit mobile device use. The monitoring user can provide the indication via the overseeing user application 28 using a client device 16. The indication can be provided in the form of a request to enable or disable use by the monitored user of one or more particular applications and/or one or more particular functional components of the monitored device 12 based on the whether a check-in communication is received from the monitored user. The monitoring manager 20 can store check-in scheduling requirements provided via the overseeing user application 28 in the user datastore 34.

A scheduled check-in can be time based. For example the monitoring manager 20 can implement a timer that counts down from the most recently received check-in to determine a time for a subsequent required check-in, for example two hours from the most recent check-in. Alternatively, a user can be required to check-in at particular times (e.g. 4:00 pm, 5:15 pm, and 8:00 pm). The monitoring user can alternatively specify scheduled check-ins to be location based. For example, the monitored user can indicate that the monitoring user is required to check-in at each new location they arrive at, for example as determined by the monitoring agent 13 via the LDS 15 on the monitored device 12 or by the mapping engine 24 of the monitoring manager 20 via a PDE 45. Alternatively, check-in requirements can be both time and location based. For example, based on a particular scheduling requirement provided by monitoring parent via the overseeing user application 28, the monitoring agent 13 can initiate a timer as soon as a monitored child carrying the monitored device 12 is determined to have left her school's grounds. The monitored child is required to check-in before the timer runs out to avoid one or more functional components and applications of the monitored device 12 being disabled by the monitoring agent 13 or monitoring manager 20.

A functional component is a hardware or software component of the monitored device 12 which enables a particular functionality such as electronic messaging, photo messaging, telephone communication, internet usage, camera usage, video camera usage, application execution, access to a graphic user interface, or other device feature. An application can include for example a gaming application, a social networking application, a video playing application, or any application executable using the monitored device 12.

In a step 104 of the method 100, a determination is made of whether a check-in communication has been initiated by the monitored user pursuant to the prescribed schedule. The monitoring agent 13 can be used by the monitored user (e.g. a monitored child) to initiate the check-in. The monitoring agent 13 facilitates packaging and sending information from the monitored user to the monitoring user (e.g. a parent), which information can include for example the monitored user's location and a message from the monitored user indicating what the monitored user is doing (e.g. practicing violin with her classmate). The monitoring agent 13 permits a user to perform the check-in via a user interface 17 where details of the monitored user's activities can be entered. The monitoring agent 13 sends the check-in communication to the monitoring manager 20, and the monitoring manager 20 forwards the check-in communication or renders the check-in communication accessible to the client device 16 of the monitoring user via suitable protocol. Alternatively, the monitoring agent 13 transmits the check-in communication directly to the monitoring user via suitable protocol and provides notification of the check-in communication to the monitoring manager. Suitable protocols can include for example SMS, email, phone or communication via the overseeing user application 28.

In an alternative implementation, the monitoring agent 13 determines whether a check-in communication has been initiated through other means. For example, the monitoring agent 13 can monitor outgoing phone calls and text messages on the monitored device 12 to determine if the monitored user is checking in with the monitoring user. For example, the monitoring agent 13 can monitor a datastore 21 of outgoing SMS, email, and phone communications on the monitored device 12.

In another alternative implementation, an application such as the overseeing user application 28 executed on the monitoring user's client device 16 can monitor the client device 16 for evidence of communication from the monitored user. For example, the monitoring agent 28 can monitor incoming phone calls and text messages on the client device 16 to determine if the monitored user is checking in with the monitoring user.

In another alternative implementation, the monitoring manager 20 can interface with an application program interface ("API") 49 enabled by a telecommunication carrier providing network service to the monitoring or monitored user to monitor for evidence of communication from the monitored user to the monitoring user, which communication can be initiated without the monitoring agent 13 or monitoring manager 20. For example, the monitoring manager 20 can enable a carrier integration application 38 integrated with the telecommunication carrier infrastructure to monitor phone calls and text messages at a network level in order to determine whether the monitored user is checking in with the monitoring user.

Referring further to FIG. 2, if a check-in communication is determined not to have been initiated pursuant to the prescribed schedule in step 104, one or more applications and functional components of the monitored device 12 are disabled (step 106). The monitoring agent 13 residing on the monitored device 12 can for example lock features of the monitored device. Alternatively, a lock can be initiated by the carrier integration application 36 integrated with the telecommunication carrier infrastructure via the carrier API 49. For example, the carrier interface application 36 can provide instructions via the carrier API 49 to lock device features at a network level based on a determination by the enablement engine 22. A notification of the lock can be provided by the monitoring agent 13 via the device user interface 17. An example notification message 62 on a display 60 of a monitored device 12 is shown in FIG. 7A which reads "Select device features have been locked since you failed to check-in with mom. Call mom to re-enable locked features."

If a check-in communication is determined to be initiated pursuant to the schedule in step 104, one or more applications and functional components of the monitored device 12 are enabled (step 108) if not already enabled. Alternatively, step 108 can be omitted, and once an application or functional component is disabled based on a failure to check-in, subsequent check-in communications do not function to re-enable such application or functional component. In such case the step 104 repeats itself until it is determined that a check-in communication has not been initiated pursuant to a prescribed schedule. For example, a late check-in can be insufficient to enable the one or more applications and functional components.

The method 100 facilitates monitoring of users such as children by other users such as their parents. The method 100 through incentivizing enables monitoring users to determine whether those under their care are safe and to determine their location and what they are doing.

Figure 3:
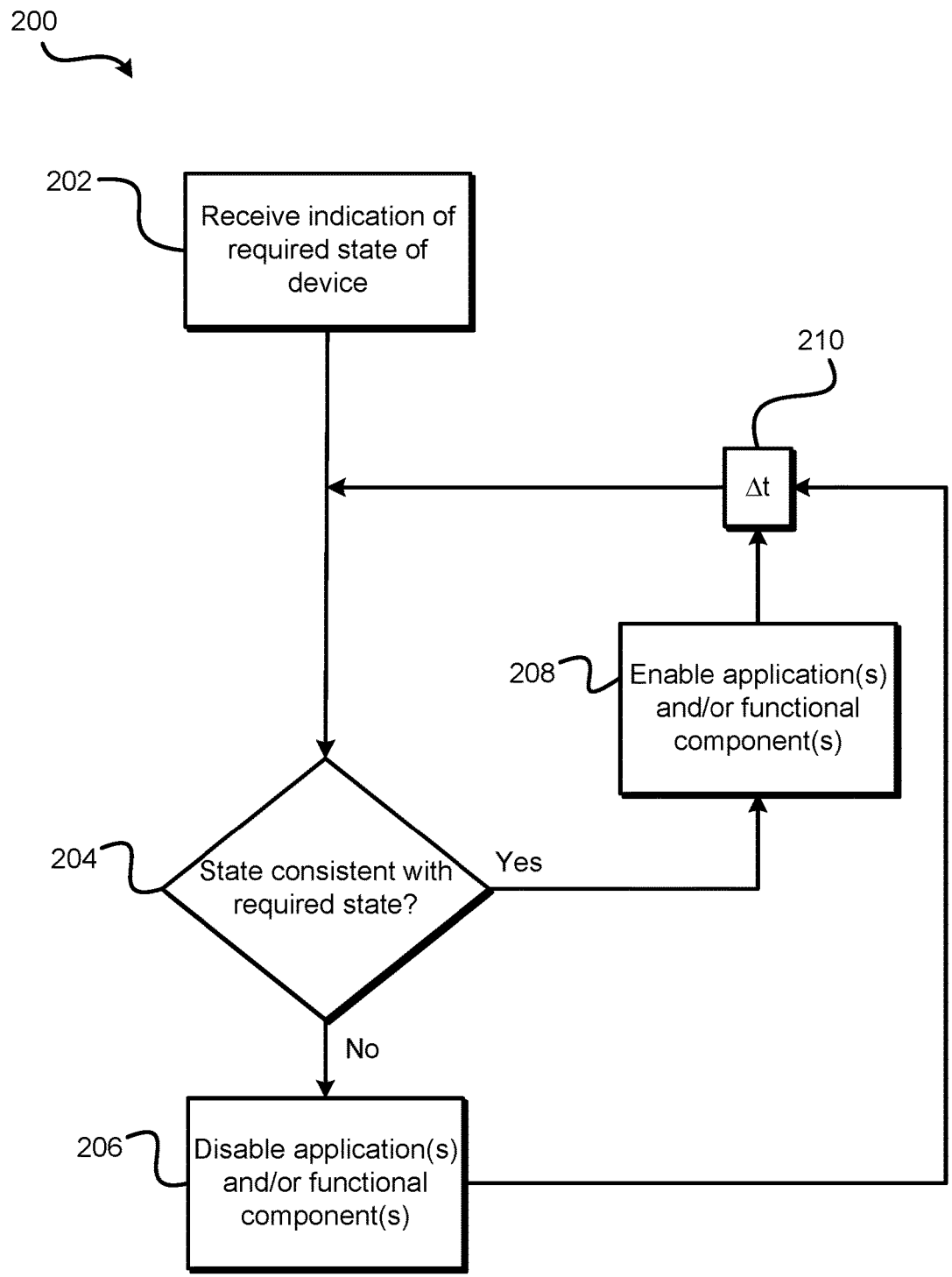

Referring to FIG. 3, a method 200 for controlling communication device use is shown. The method 200 is described with reference to the components shown in the system 10 of FIG. 1, including the monitoring manager 20 and monitoring agent 13, which are preferably configured for performing the method 200 and include or have access to suitable non-transitory data storage including instructions for performing the method 200. The method may alternatively be performed by the monitoring agent 13 alone, the monitoring manager 20 alone, or via other suitable systems and devices. The method 200 is not limited to the components shown in FIG. 1 which are merely exemplary.

In a step 202, the monitoring manager 20 receives from a first user (hereinafter "monitoring user") an indication of a required state of a mobile device corresponding to a second user (hereinafter "monitored user"). The monitoring user can correspond for example to a parent, and the monitored user can correspond to a child of the parent for whom the parent desires to control or limit mobile device use. The monitoring user can provide the indication via the overseeing user application 28 using a client device 16. The indication can be provided in the form of a request to enable or disable the use by the monitored user of one or more particular applications and/or one or more particular functional components of the monitored device 12 based on the whether the current state of the mobile device is inconsistent with the required state. The monitoring manager 20 can maintain store requirements provided via the overseeing user application 28 in the user datastore 34.

The indication of the state can include an indication of a minimum battery charge of the monitored device 12. For example, a parent may want to be certain that her child carrying a mobile monitored device 12 is contactable, in which case the mobile device should have sufficient battery charge to remain operable. The indication of the state can alternatively include a requirement that a particular functional component such as a GPS receiver or WiFi protocol transceiver be on and enabled on the monitored device 12. For example, a parent may want to include such requirement to be certain that applications such as the monitoring agent 13 which can use GPS or WiFi protocol for tracking the location of their child remain operable.

It is determined in a step 204 if the current state of the monitored device 12 is consistent with the required state. The current state is consistent with the required state for example if a battery charge of the monitored device 12 is at a level greater than a particular required minimum charge. In another example, the current state is consistent with the required state if a GPS receiver or WiFi transceiver of the monitored device 12 is enabled. In yet another example, the current state is consistent with the required state if a phone ringer or other audible or vibratory notifier of an incoming communication of the monitored device 12 is enabled.

If the current state is determined to be inconsistent with the required state, for example the battery charge is at a level less than an indicated minimum or the GPS receiver, WiFi transceiver, or phone ringer is disabled, one or more application and/or one or more functional components of the monitored device 12 are disabled (step 206). One or both of the monitoring agent 13 and the monitoring manager 20 can initiate a lock to disable an application or functional component of the monitored device 12. A notification of the lock can be provided by the monitoring agent 13 via the device user interface 17. An example notification message 64 on the display 60 of the monitored device 12 is shown in FIG. 7B which reads "Select device features have been locked since your battery charge is less than 15%. Charge your device to re-enable locked features." If the current state is determined to be consistent with the required state, one or more applications and/or one or more functional components are enabled if not already enabled (step 208) and the method returns to step 204 after a particular period of time Δt (step 210) to again determine the current state. Alternatively, step 208 can be omitted, wherein once an application or functional component is disabled in step 206 the process ends, and from step 204 the method skips to step 210 if a current state is determined to be consistent with a required state.

Figure 4:
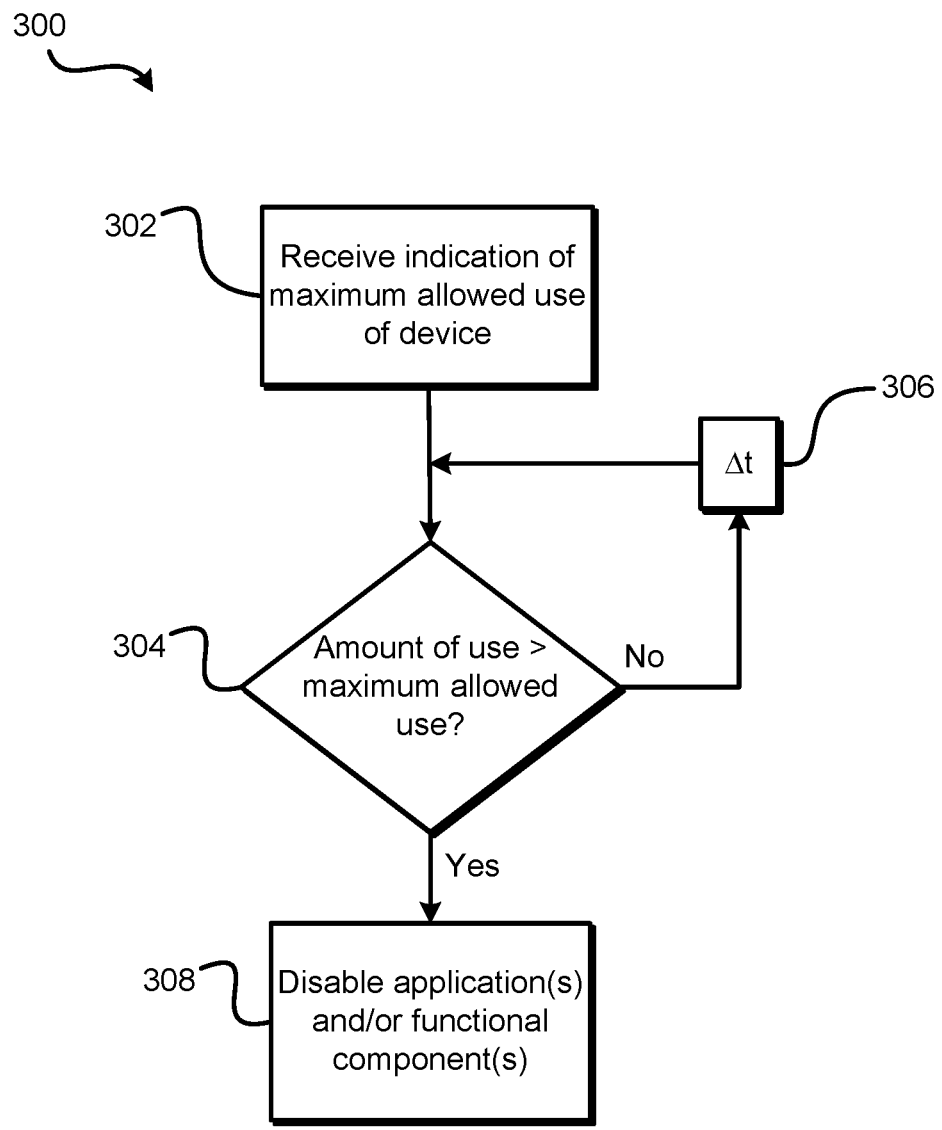

Referring to FIG. 4, a method 300 for controlling communication device use is shown. The method 300 is described with reference to the components shown in the system 10 of FIG. 1, including the monitoring manager 20 and monitoring agent 13, which are preferably configured for performing the method 300 and include or have access to suitable non-transitory data storage including instructions for performing the method 300. The method 300 may alternatively be performed by the monitoring agent 13 alone, the monitoring manager 20 alone, or via other suitable systems and devices. The method 300 is not limited to the components shown in FIG. 1 which are merely exemplary.

In a step 302, the monitoring manager 20 receives from a first user (hereinafter "monitoring user") an indication of maximum allowed use of a monitored device 12 corresponding to a second user (hereinafter "monitored user"). The monitoring user can correspond for example to a parent, and the monitored user can correspond to a child of the parent for whom the parent desires to control or limit mobile device use. The monitoring user can provide the indication via the overseeing user application 28 using a client device 16. The indication can be provided in the form of a request to enable or disable the use by the monitored user of one or more particular applications and/or one or more particular functional components of the monitored device 12 based on the amount of use of particular applications or functional components of the monitored device 12. The monitoring manager 20 can store indications of maximum allowed use provided via the overseeing user application 28 in the user datastore 34.

The maximum allowed use can correspond to maximum allowed communication use such as a maximum allowed number of transmitted Short Message Service (SMS) messages and maximum quantity or duration of phone use. Alternatively, the maximum allowed use can correspond to a maximum allowed use of one or more applications such as gaming or social networking applications. A parent for example may want to limit their child's transmitted text messages to 100 per day or limit use by their child of one or more gaming applications to 2 hours a day.

An amount of use of the at least one device is determined in a step 304, for example the number of transmitted Short Message Service (SMS) messages or quantity or duration of phone use. If the amount of use is less than or equal to the maximum allowed use, the method returns to step 304 after a particular period of time Δt (step 306) to again determine the amount of use. If the determined amount of use is greater than the maximum allowed use, one or more applications and/or one or more functional components of the monitored device 12 are disabled (step 308). One or both of the monitoring agent 13 and the monitoring manager 20 can initiate a lock to disable an application or functional component of the monitored device 12. The monitoring agent 13 residing on the monitored device 12 can for example lock features of the mobile device. Alternatively, a lock can be initiated by the carrier integration application 38 integrated with the telecommunication carrier infrastructure via the carrier API 49. For example, the carrier integration application 38 can provide instructions to the carrier API 49 to lock phone features at a network level. A notification of the lock can be provided by the monitoring agent 13 via the device user interface 17. An example notification message 66 on the display 60 of the monitored device 12 is shown in FIG. 7C which reads "Select device features have been locked since transmitted SMS messages have exceeded 50 today."

The monitoring manager 20 can further receive from the monitoring user indications of exceptions including for example white-listed contacts or applications. Communications with a contact indicated as an exception are not used in determining the amount of use of the monitored device 12 or in determining whether use has exceeded the maximum allowed use. For example, a parent may not want to discourage communication with their child's grandparent, so the grandparent can be indicated as an exception. Executed applications indicated as exceptions are not counted in determining the amount of use or in determining whether use has exceeded the maximum allowed use. For example, a parent may want to encourage use of certain educational applications, so such educational applications can be indicated as exceptions.

Figure 5:
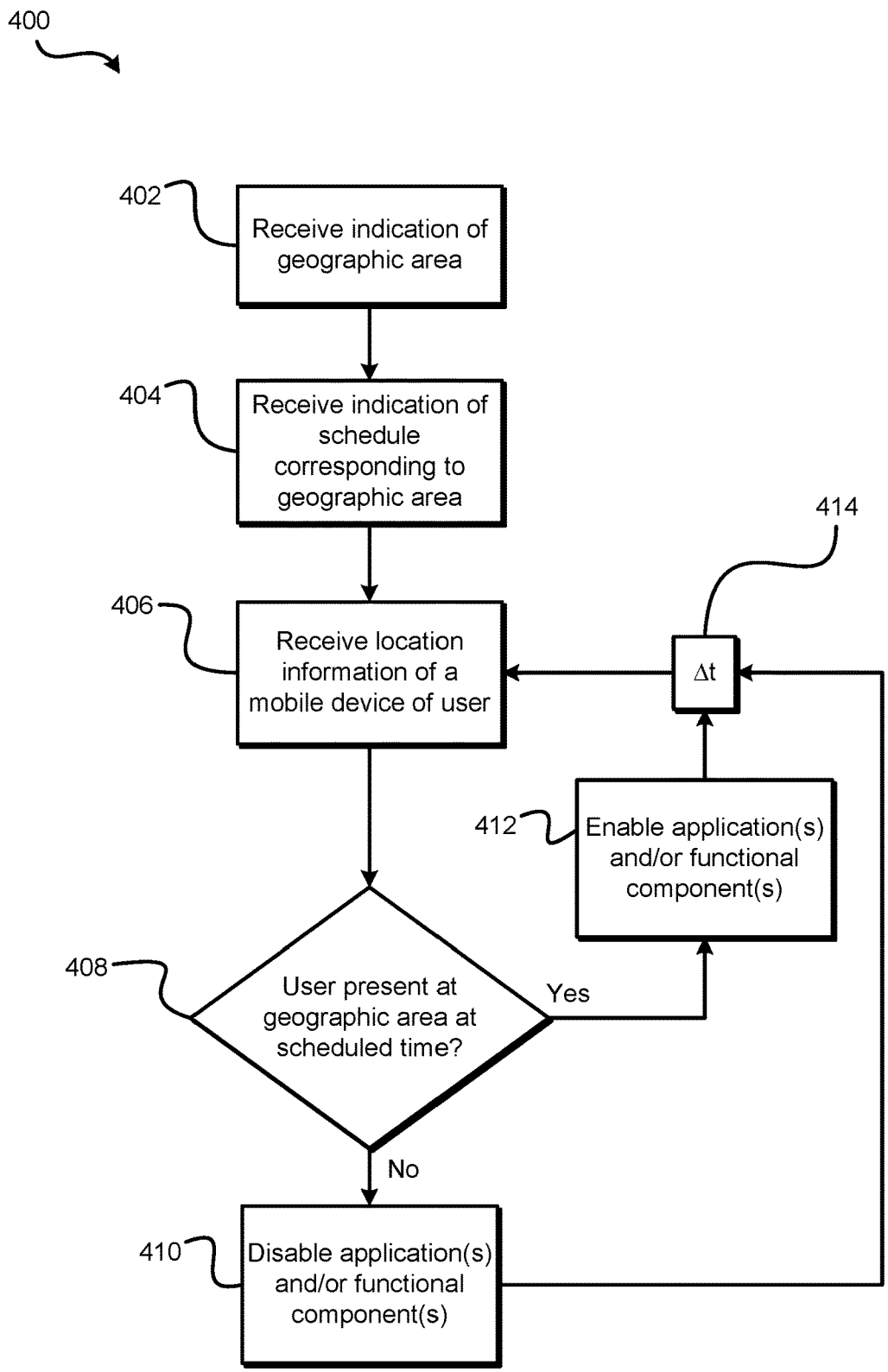

Referring to FIG. 5, a method 400 for controlling communication device use is shown. The method 400 is described with reference to the components shown in the system 10 of FIG. 1, including the monitoring manager 20 and monitoring agent 13, which are preferably configured for performing the method 400 and include or have access to suitable non-transitory data storage including instructions for performing the method 400. The method 400 may alternatively be performed by the monitoring agent 13 alone, the monitoring manager 20 alone, or via other suitable systems and devices. The method 400 is not limited to the components shown in FIG. 1 which are merely exemplary.

In a step 402, the monitoring manager 20 receives from a first user (hereinafter "monitoring user") an indication of a geographic area. In a step 404, the monitoring manager 20 receives an indication from the monitoring user of a schedule corresponding to one or more times at which a particular second user (hereinafter "monitored user") is required to be present at the geographic area. The indication of the geographic area can correspond to an address, a geographic coordinate, a name corresponding to a particular location, or any suitable description of a geographic area.

The monitoring user can provide the indications via the overseeing user application 28 using a client device 16. The indications can be provided in the form of a request to enable or disable the use by the monitored user of one or more particular applications and/or one or more particular functional components of the monitored device 12 based on failure of the monitored user to arrive a particular geographic area at a particular time. The monitoring manager 20 can store indications provided via the overseeing user application 28 in the user datastore 34.

In a step 406, location information of the monitored device 12 corresponding to the monitored user is received. Location information can be received by the monitoring agent 13 and/or the monitoring manager 20 via the LDS 15, via a network accessible position determining entity (PDE) 45, or via other suitable source. In a step 408, it is determined whether the location information indicates that the monitored user is present at the geographic area at a time required by the schedule provided by the monitoring user. The determination can be made by the monitoring manager 20 for example via the mapping engine 24 or via the monitoring agent 13. If it is determined that the monitored user is not present as required by the schedule, one or more applications and/or one or more functional components of the monitored device 12 are disabled (step 410) if not already disabled. A notification that such applications or functional components are disabled can be provided by the monitoring agent 13 via the device user interface 17. An example notification message 68 on the display 60 of the monitored device 12 is shown in FIG. 7D which reads "Select device features have been locked since you arrived late to school today."

If it is determined that the monitored user is present at the designated geographic area as required by the schedule, one or more applications and/or one or more functional components of the device are enabled (step 412) if not already enabled, and the process returns to step 406 after a period of time Δt (step 414). Accordingly, an incentive is provided for the monitored user to arrive at a particular location at a time designated by the monitoring user, and a disincentive is provided for the monitored user to arrive late to a particular location after a time designated by the monitoring user.

Alternatively, step 412 can be omitted, wherein once an application or functional component is disabled in step 410 the process ends, and from step 408 the method skips to step 414 if the monitored user is determined to be present at the designated geographic area pursuant to the indicated schedule. In such case, once an application or functional component is disabled based on the monitored user's failure to be present at a particular geographic area at a scheduled time, such application or functional component is not re-enabled based on the monitored user's presence at a particular location at a future time according to the indicated schedule.

By the method 400 a user can be reprimanded or rewarded with more or less restricted use of their mobile device. For example, a parent can provide an indication of a time required for their child to arrive at school in an effort to incentivize arriving on time to school, wherein if the child arrives to school on time a particular day, all functional components and applications on the child's mobile phone are enabled after the school day. If the child arrives late to school, one or more functional components and/or applications on the mobile phone can be disabled and remain disabled after the school day.

Two or more of the methods 100, 200, 300 and 400 can be operated concurrently in controlling use of a particular device. These methods can operate independently via the monitoring manager 20 and monitoring agent 13. For example, features of the monitored device 12 are unlocked if battery charge is above a particular threshold and locked if battery charge is below a particular threshold without regard to other behavior of the monitored user. Alternatively, criteria set forth for triggering disabling and enabling functional components and applications are combined into a system of multipliers in which a monitored user has a depletable reserve of unrestricted use of her monitored device 12. A value of the reserve can for example decay based on passage of time, based on use of the monitored device 12, or based on a determination of undesirable user behavior, for example failure to check-in with a monitoring user. The reserve can be replenished for example by the passing of time (e.g. a daily reset of the value of the reserve) or based on a determination of desirable user behavior (e.g. checking in with a monitoring user). The monitoring agent 13 can enable a user interface 17 to provide a monitored user a view of their current reserve value, an indication of past actions contributing to the rise and fall of the reserve value, and an indication of suggested actions which can most effectively increase the current reserve value to permit enablement of functional components or applications.

Figure 6:
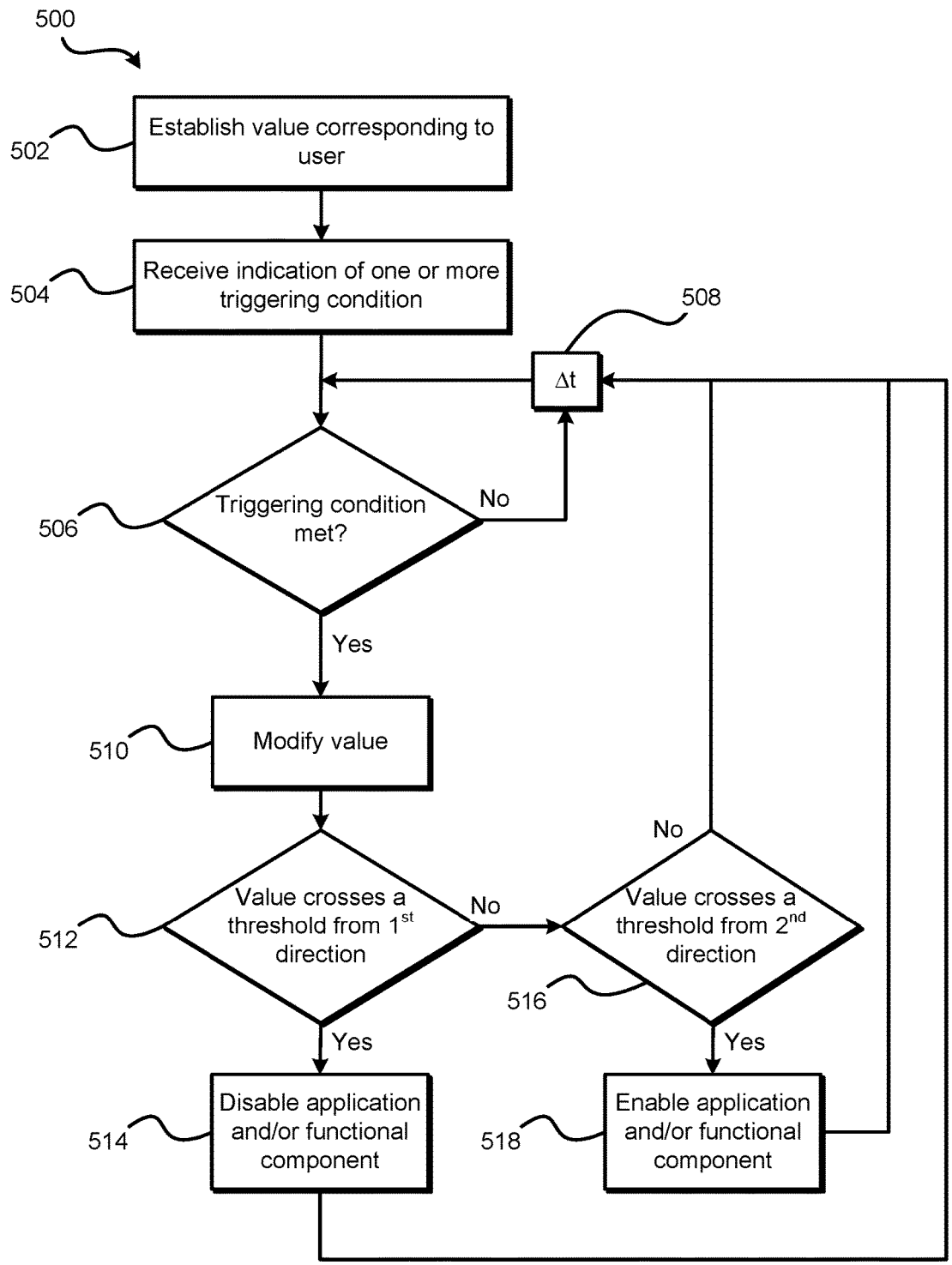

Referring to FIG. 6, a method 500 for controlling communication device use based on particular triggering conditions is shown. The method 500 is described with reference to the components shown in the system 10 of FIG. 1, including the monitoring manager 20 and monitoring agent 13, which are preferably configured for performing the method 100 and include or have access to suitable non-transitory data storage including instructions for performing the method 500. The method 500 may alternatively be performed by the monitoring agent alone, or the monitoring manager via other suitable systems and devices. The method 500 is not limited to the components shown in FIG. 1 which are merely exemplary.

In a step 502, the monitoring manager 20 establishes a value corresponding to a particular user of a monitored device 12. In a step 504, the monitoring manager 20 receives an indication of one or more triggering conditions of the particular user corresponding to the monitored device 12, the one or more triggering conditions being at least one of enabled by the monitored device 12 and measurable by the monitored device 12. The indications of triggering conditions can be provided for example by a parent of the particular user via the overseeing user application 28. The established values and the indications of triggering conditions can be stored in the user datastore 34.

In a step 506, it is determined whether one or more of the triggering conditions have been met by the particular user via the monitored device 12. A triggering condition can correspond to an arguably undesirable behavior, for example a failure to perform a check-in communication according to a particular schedule using the monitored device 12, a failure to maintain a battery charge of the monitored device 12 above a particular threshold level, performing communication of quantity or duration greater than a particular maximum allowed threshold, and not being present at a particular geographic area at a particular specified time. Alternatively, the triggering condition can correspond to an arguably desirable behavior, for example performing a check-in communication according to a particular schedule using the mobile device, charging a battery to a particular threshold level, performing communication of quantity or duration less than a particular maximum allowed threshold over a period of time, and being present at a particular geographic area at a particular specified time. The particulars of the triggering conditions, including for example a schedule for performing check-ins, a threshold battery charge, an allowed communication threshold, and a schedule for being present at particular geographic areas, can be provided by a monitoring user such as a parent of the particular user via the overseeing user application 28.

If a triggering condition is not met, step 506 is repeated after a period of time Δt (step 508). If a triggering condition is met, the established value is modified (step 510). For example, the value can be decreased if a first triggering condition is met and the value can be increased if a second triggering condition is met, wherein for example the first triggering condition corresponds to undesirable behavior, and the second triggering condition corresponds to a desirable behavior. It is determined in a step 512 if the value crosses a particular threshold from a first direction, and if not, it is determined in a step 516 if the value crosses a particular threshold from a second direction. If it is determined in step 512 that the value crosses a particular threshold from the first direction, one or more particular applications and/or one or more functional components of the monitored device 12 are disabled (step 514), if not already disabled. The threshold can correspond for example to a numeric indicator such as 0 wherein the one or more applications and functional components are disabled responsive to the value dropping from a value above 0 to a value equal to or less than 0, the first direction being from positive value to zero value or from positive value to negative value. If it is determined in step 516 that the value crosses another particular threshold in a second direction, one or more applications and/or one or more functional components of the device 12 are enabled (step 518), if not already enabled. The other particular threshold can correspond for example to a numeric indicator such as 0 or other numeric count wherein the one or more applications and functional components are enabled responsive to the value increasing from a value less than or equal to 0 to a value greater than 0, the second direction being from negative or zero value to positive value. After enabling or disabling the one or more applications and functional components, the process returns to step 506 after a period of time Δt (step 508). The thresholds in steps 512 and 516 need not be of the same value. Further, steps 516 and 518 can be omitted, for example based on preference indication of a monitoring user, in which case step 512 skips to step 508 if the particular value does not cross the threshold, and the method ends after the one or more applications and functional components are disabled in step 514.

Different triggering conditions can be weighted differently, wherein when a particular triggering condition is met, a reserve value is modified based on the particular triggering conditions weighting. A monitoring user via the overseeing user application 28 is enabled to set and adjust the weights based on preference. For example failure to check-in may result in a 5 count decrease in reserve value, whereas failure to maintain battery charge may result in a 2 count decrease in reserve value.

Referring to FIG. 7E, an example notification message 70 indicating that one or more applications and functional components are disabled pursuant to the method 500 is shown on the display 60 of the mobile device 12. The message 70 further indicates behavior contributing to the disablement. The message reads "Select device features have been locked based on recent behavior including: 1. failure to check in, 2. arriving late to home, 3. excess SMS use." Referring to FIG. 7F, an example notification message 72 indicating that one or more applications and functional components are disabled pursuant to the method 500 is shown on the display 60 of the mobile device 12. The message 72 further indicates behavior which can contribute to re-enablement of the applications or functional components. The message reads "Select device features have been locked based on recent behavior. Check in with Mom and charge device to unlock features." Referring to FIG. 7G, an example notification message 74 indicating a monitored user's current reserve value pursuant to the method 500 is shown on the display 60 of the mobile device 12. The message 74 further indicates behavior which can contribute to an increase in the reserve value. The message reads "Your device reserve value is 12 points. Select features are locked when reserve value reaches 0. Arrive at school by 8:00 am to increase reserve value."

Hooks are provided to allow for other applications or systems to call into the monitoring manager 20 or monitoring agent 13 to provide an indication of activity of the monitored user to the monitoring manager 20 to control functional components or applications or modify a value tied to control of functional components or applications on a monitored device 12. For example, educational games and other applications and systems, represented by contributing systems 47 and app 19 in FIG. 1, can be integrated with APIs enabled by the monitoring manager 20 or monitoring agent 13 to permit a monitored user to be rewarded for example for time spent or achievements earned using a particular application or participating in a particular activity.

Contributing systems 47 can include for example school information systems which can correlate a monitored child's completion of homework, grades and overall school performance with enablement of applications or functional components on the child's monitored device 12. The contributing systems 47 can further correspond for example to classroom teachers, babysitters, caregivers or others who look to incentivize desirable behavior with unrestricted or less restricted device use. The contributing systems 47 can further correspond for example to banking systems, wherein a monitored user is rewarded with unrestricted or less restricted device use or value corresponding to unrestricted or less restricted device use based on maintaining a particular bank balance. Contributing systems 47 or applications 19 corresponding to behaviors or activities of a monitored user can be selected by a monitoring user to tie into enablement of functional components and applications of a monitored device 12. The contributing systems 47 and applications 19 can provide indication of activity to the monitoring manager 20 or monitoring agent 13, wherein operability of functional components or applications or a value tied to such operability is controlled at least in part by such indication of activity.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A computer implemented method of controlling use of a mobile communication device, the method comprising:
    establishing a value corresponding to a particular user of the device;
    receiving an indication of at least one triggering condition of the particular user of the device, the at least one triggering condition being based on a level of battery charge;
    determining at a plurality of times that the at least one triggering condition has been met based on measurement by the device;
    modifying the value based on an aggregating of the determining of the at least one triggering condition has been met at the plurality of times;
    determining when the value crosses a particular threshold; and
    disabling at least one of an application or a functional component of the device responsive to the value crossing the particular threshold.

2. The computer implemented method of claim 1, wherein receiving the indication of the at least one triggering condition comprises receiving an indication corresponding to a required battery charge of the device, the method further comprising:
    determining a battery charge of the device at the plurality of times; and
    modifying at the value responsive to determining battery charge being less than a particular minimum battery charge at the plurality of times.

3. The computer implemented method of claim 2, further comprising receiving an indication of the particular minimum battery charge.

4. The computer implemented method of claim 1, wherein the at least one triggering condition comprises a failure to maintain a battery charge of the device at a particular threshold level.

5. The computer implemented method of claim 1, wherein the at least one triggering condition comprises charging a battery of the device to a particular threshold level.

6. A mobile communication device of a first user comprising a processor-enabled monitoring agent configured for:
    receiving an indication of a required level of battery charge of the mobile communication device;
    monitoring a battery charge level of the mobile communication device;
    determining at a plurality of times that the battery charge level has decreased below the required level of battery charge;
    modifying an established value based at least on an aggregating of the determining at the plurality of times that the battery charge level has decreased below the required level of battery charge;

determining when the value crosses a particular threshold; and disabling at least one of an application or a functional component of the mobile communication device responsive to the value crossing the particular threshold.

7. The mobile communication device of claim 6, the processor-enabled monitoring agent configured for re-enabling the at least one of the application or the functional component of the mobile communication device responsive to the level of battery charge level increasing above a particular threshold level.

8. The mobile communication device of claim 6, the processor-enabled monitoring agent further configured for further modifying the established value based on a failure to perform a check-in communication using the mobile communication device.

9. The mobile communication device of claim 6, the processor-enabled monitoring agent further configured for:
monitoring communications by the first user using the mobile communication device; and
further modifying the established value based on the communications exceeding at least one of a particular quantity or a particular duration.

10. The mobile communication device of claim 6, the processor-enabled monitoring agent further configured for:
receiving an indication of a particular functional component of the device;
monitoring the particular functional component; and
further modifying the established value based on whether the particular functional component is at least partially disabled.

11. The mobile communication device of claim 10, wherein the particular functional component comprises a Global Positioning System (GPS) receiver of the device.

12. The mobile communication device of claim 6, the processor-enabled monitoring agent further configured for:
monitoring communications of the mobile communication device;
further modifying the established value based on at least one of the first user performing a check-in communication to a second user or a failure by the first user to perform a check-in communication to the second user using the mobile communication device; and
further modifying the established value based on at least one of a quantity or duration of communications performed by the first user.

13. The mobile communication device of claim 6, the processor-enabled monitoring agent further configured for:
monitoring location of the mobile communication device via Global Positioning System (GPS) hardware of the mobile communication device; and
further modifying the established value based on the monitored location of the mobile communication device.

* * * * *